United States Patent
Lee (10) Patent No.: US 7,463,230 B2
(45) Date of Patent: Dec. 9, 2008

(54) LINE ON GLASS LIQUID CRYSTAL DISPLAY AND METHOD OF FABRICATING THE SAME

(75) Inventor: Young Hun Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 733 days.

(21) Appl. No.: 11/149,164

(22) Filed: Jun. 10, 2005

(65) Prior Publication Data

US 2005/0286004 A1    Dec. 29, 2005

(30) Foreign Application Priority Data

Jun. 28, 2004    (KR) .................... 10-2004-0049033

(51) Int. Cl.
*G09G 3/36*    (2006.01)
(52) U.S. Cl. .................. 345/87; 345/100; 345/104; 345/204
(58) Field of Classification Search .................. 345/87, 345/100, 104, 204
See application file for complete search history.

(56) References Cited

U.S. PATENT DOCUMENTS 6,639,589 B1 *  10/2003  Kim et al. .................... 345/206
7,342,634 B2 *   3/2008  Park .......................... 349/151

* cited by examiner

*Primary Examiner*—Richard Hjerpe
*Assistant Examiner*—Leonid Shapiro
(74) *Attorney, Agent, or Firm*—Morgan Lewis & Bockius LLP

(57) ABSTRACT

A line on glass liquid crystal display includes a liquid crystal display panel on a substrate and having liquid crystal cells in matrix; gate and data lines on the liquid crystal display panel; a thin film transistor at intersections of the gate and data lines; at least two types of a plurality of integrated circuits at peripheral portion of the liquid crystal display panel to drive the liquid crystal display panel; first signal lines on the substrate of the liquid crystal display panel to supply an input driving signal to the plurality of first type integrated circuits; and second signal lines to supply an output driving signal to the liquid crystal display panel, wherein at least one of a line width and a line thickness of each of the second signal lines are different such that a resistance value of corresponding first signal lines are different from each other.

17 Claims, 5 Drawing Sheets

LINE ON GLASS LIQUID CRYSTAL DISPLAY AND METHOD OF FABRICATING THE SAME

This application claims the benefit of Korean Patent Application No. P2004-49033 filed in Korea on Jun. 28, 2004, which is hereby incorporated by reference.

BACKGROUND OF THE INVENTION

1. Field of the Invention

This invention relates to a liquid crystal display and a method of fabricating the same, and more particularly, to a line on glass (LOG) liquid crystal display and a method of fabricating the same.

2. Discussion of the Related Art

In general, a liquid crystal display (LCD) controls a light transmittance of a liquid crystal having a dielectric anisotropy by applying an electric field to the liquid crystal, thereby displaying a picture. The LCD includes a liquid crystal display panel having liquid crystal cells arranged in matrix and a driving circuit for driving the liquid crystal display panel.

In the liquid crystal display panel, the liquid crystal cells arranged in matrix controls the light transmittance in accordance with the pixel signals to display a picture. The driving circuit includes a gate driver for driving gate lines of the liquid crystal display panel, a data driver for driving data lines, a timing controller for controlling a driving timing of the gate and the data drivers, and a power supply for supplying power signals to drive the liquid crystal display panel and the driving circuit.

The data driver and the gate driver are separated into a plurality of integrated circuits (ICs) and manufactured as a chip. Each of the integrated drive ICs is mounted in an opened IC area of a tape carrier package (TCP) or in a base film of the TCP by a chip on film (COF) system. Also, each of the integrated drive ICs is electrically connected to the liquid crystal display panel by a tape automated bonding (TAB) system. Alternatively, the drive IC may be directly mounted on the liquid crystal display panel by a chip on glass (COG) system. The timing controller and the power supply are manufactured into a chip shape to be mounted on a main printed circuit board (PCB).

The drive ICs connected to the liquid crystal display panel by the TCP uses a flexible printed circuit (FPC) and a sub-PCB to connect to the timing controller and the power supply on the main PCB. More specifically, the data drive ICs receive data control signals and pixel data from the timing controller, and power signals from the power supply mounted on the main PCB using the data FPC and the data PCB. Similarly, the gate drive ICs receive gate control signals from the timing controller, and power signal from the power supply mounted on the main PCB using the gate FPC and the gate PCB. The drive ICs mounted on the liquid crystal display panel by the COG system receive control signals and pixel signals from the timing controller, and power signals from the power supply mounted on the main PCB through the FPC and line on glass (LOG) signal lines provided at the liquid crystal display panel.

Recent improvements in the LCD technology include adapting the LOG signal lines to eliminate the PCB even when the drive ICs are connected to the LCD panel via the TCP. Specifically, the gate PCB delivering a relatively small number of signals is removed, thereby, reducing the thickness of the LCD. In addition, signal lines for applying the gate control signals and the power signals to the gate drive ICs are provided in a LOG liquid crystal display panel. Accordingly, the gate drive ICs mounted in the TCP receive the gate control signals from the timing controller and the power signals from the power supply using the main PCB, FPC, the data PCB, the data TCP, the LOG signal lines and the gate TCP. In this case, the gate control signals and the gate power signals applied to the gate drive ICs are distorted by line resistances of the LOG signal lines, thereby causing the deterioration of quality in pictures displayed on the liquid crystal display panel.

Figure 1:
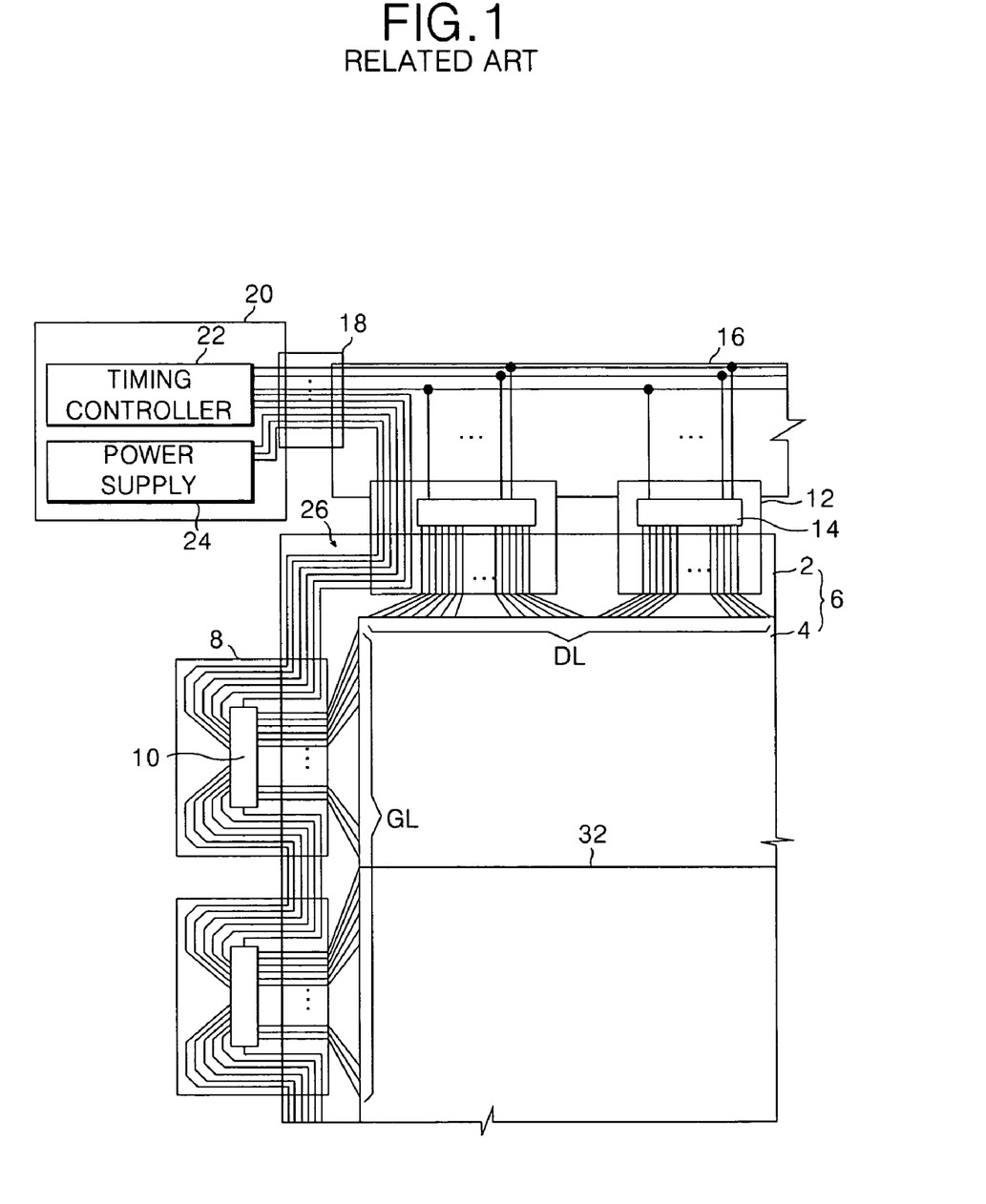
FIG. 1 is a plan view illustrating a related art line on glass (LOG) type liquid crystal display.

More specifically, as shown in FIG. 1, a related art LOG LCD, which is separated from the gate PCB, includes a main PCB 20 provided with a timing controller 22 and a power supply 24, a data PCB 16 connected to the main PCB 20 via a FPC 18, a data TCP 12 having a data driving IC 14 and being connected between the data PCB 16 and a liquid crystal display panel 6, and a gate TCP 8 having a gate driving IC 10 and being connected to the liquid crystal display panel 6.

In the liquid crystal display panel 6, a thin film transistor array substrate 2 and a color filter array substrate 4 are joined to each other with a liquid crystal interposed therebetween. Such a liquid crystal display panel 6 is provided with liquid crystal cells, in which each liquid crystal cell is driven independently by a thin film transistor (TFT) provided at the intersections of gate lines GL and data lines DL. The thin film transistor applies a pixel signal from the data line DL to the liquid crystal cell in response to a scanning signal from the gate line GL.

The data drive ICs 14 are connected to the data lines DL, via the data TCP 12 and a data pad of the liquid crystal display panel 6. The data drive ICs 14 convert a pixel data into an analog pixel signal and apply to the data lines DL. The data drive ICs 14 receive a data control signal, a pixel data, and power signals from the timing controller 22 and the power supply 24 mounted on the main PCB 20 using the data PCB 16 and the FPC 18.

The gate drive ICs 10 are connected to the gate lines GL via the gate TCP 8 and a gate pad of the liquid crystal display panel 6. The gate drive ICs 10 sequentially apply a scanning signal having a high gate voltage VGH to the gate lines GL. Furthermore, the gate drive ICs 10 apply a low gate voltage VGL to the gate lines GL in the remaining interval when the high gate voltage VGH is not supplied.

The gate control signals from the timing controller 22 and the power signals from the power supply 24 are applied to the data TCP 12 via the FPC 18 and the data PCB 16. The grate control signals and the power signals applied through the data TCP 12 are supplied to the gate TCP 8, via a LOG signal line group 26 provided at the edge portion of the thin film transistor array substrate 2. The gate control signals and the power signals applied to the gate TCP 8 are input within the gate drive IC 10 via input terminals of the gate drive IC 10. Furthermore, the gate control signals and the power signals are output via output terminals of the gate drive IC 10, and applied to the next gate drive IC 10 mounted in the next gate TCP 8 via the gate TCP 8 and the LOG signal line group 26.

The LOG signal line group 26 typically comprises signal lines for supplying direct current driving voltages from the power supply 24 (for example, a low gate voltage VGL, a high gate voltage VGH, a common voltage VCOM, a ground voltage GND and a base driving voltage VCC), and gate control signals from the timing controller 22 (for example, a gate start pulse GSP, a gate shift clock signal GSC and a gate enable signal GOE).

The LOG signal line group 26 as described is formed in a fine pattern from the same gate metal layer as the gate lines at a specific pad area of the thin film transistor array substrate 2. Furthermore, the LOG signal line group 26 is in contact with the gate TCP 8 by ACF bonding, thereby increasing an area of contact with the gate TCP 8 to enlarge a contact resistance.

Thus, the LOG signal line group 26 has a larger line resistance than the signal lines on the existent gate PCB. This line resistance distorts gate control signals (i.e., GSP, GSC and GOE) and power signals (i.e., VGH, VGL, VCC, GND and VCOM) transmitted via the LOG signal line group 26, thereby generating errors, such as horizontal stripe, a stain, a cross talk in a dot pattern and a greenish color to cause deterioration in picture quality.

Figure 2:
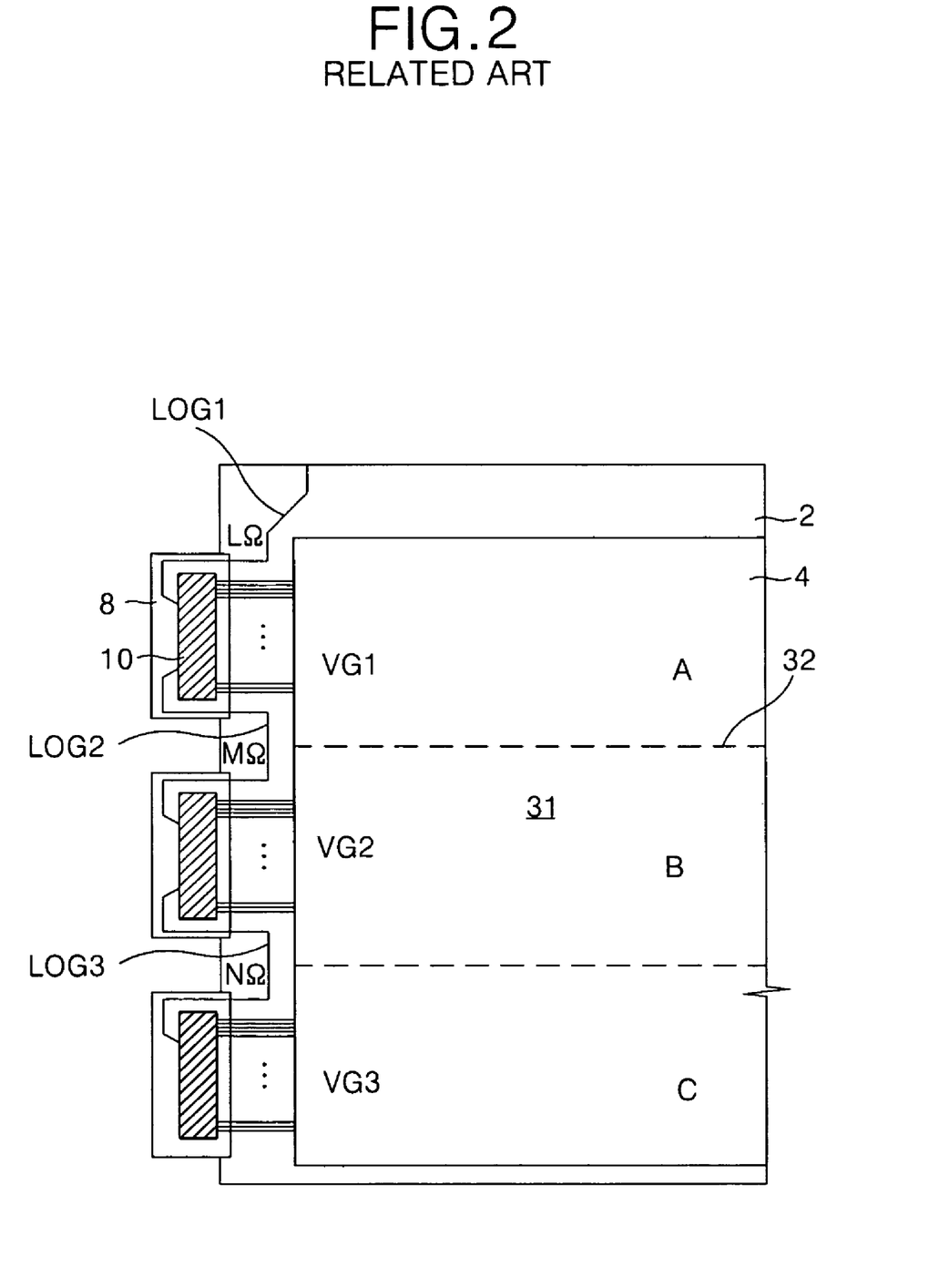
FIG. 2 is a plan view for explaining a horizontal line strip phenomenon in the related art liquid crystal display of FIG. 1.

For instance, as shown in FIG. 2, the related art LOG signal line group 26 supplying the gate control signals (i.e., GSP, GSC and GOE) and the power signals (i.e., VGH, VGL, VCC, GND and VCOM) is comprises first to third LOG signal line groups LOG1 to LOG3 between the gate TCPs 8. The groups LOG1 to LOG3 have line resistances LΩ, MΩ and NΩ proportional to the line length, respectively. The groups LOG1 to LOG3 are connected to each other in series via the gate TCP 8 and the gate drive IC 10. Such LOG signal line groups LOG1 to LOG3 generate a level difference between the gate control signals (i.e., GSP, GSC and GOE) and the power signals (i.e., VGH, VGL, VCC, GND and VCOM) input for each of the corresponding gate drive IC 10. As a result, a difference in brightness is generated among horizontal line blocks A to C driven by different gate drive IC 10 to cause a horizontal line stripe 32.

More specifically, the first gate drive IC 10 is supplied with the gate control signals GSP, GSC and GOE and the power signals VGH, VGL, VCC, GND and VCOM voltage-dropped by the line resistance LΩ of the first LOG signal line group LOG1. The second gate drive IC 10 is supplied with those voltage-dropped by the line resistances LΩ+MΩ of the first and second LOG signal line groups LOG1 and LOG2. The third gate drive IC 10 is supplied with those voltage-dropped by the line resistances LΩ+MΩ+NΩ of the first to third LOG signal line groups LOG1 to LOG3. Thus, a voltage difference is generated among gate signals VG1 to VG3 applied to the gate lines at the first to third horizontal blocks A to C, thereby causing horizontal line stripes 32 among the horizontal line blocks A to C.

Difference in the gate voltage by the gate drive IC 10 unit can be compensated by increasing a sectional area of the LOG signal line group 26 in inverse proportion to the line length. However, since the edge portion of the liquid crystal display panel 6 provided with the LOG signal line group 26 is limited, there is a limitation to increase a sectional area.

SUMMARY OF THE INVENTION

Accordingly, the present invention is directed to a line on glass (LOG) liquid crystal display and method of fabricating the same that substantially obviates one or more of the problems due to limitations and disadvantages of the related art.

An object of the present invention is to provide a LOG LCD structure to compensate the voltage difference of the gate driving signal supplied by the gate drive ICs and a line resistance of the LOG signal line group.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the line on glass (LOG) type liquid crystal display and method of fabricating the same includes, a line on glass liquid crystal display including a liquid crystal display panel on a substrate and having liquid crystal cells in matrix; gate lines and data lines on the liquid crystal display panel; a thin film transistor at intersections of the gate lines and data lines; at least two types of a plurality of integrated circuits at peripheral portion of the liquid crystal display panel to drive the liquid crystal display panel; first signal lines formed directly on the substrate of the liquid crystal display panel to supply an input driving signal to the plurality of first type integrated circuits; and second signal lines to supply an output driving signal to the liquid crystal display panel generated in the plurality of first type integrated circuits, wherein at least one of a line width and a line thickness of each of the second signal lines are different such that a resistance value of corresponding first signal lines are different from each other.

In another aspect, a method of fabricating a lines on glass type liquid crystal display including a liquid crystal display panel having liquid crystal cells in matrix on a substrate, data lines and gate lines on the liquid crystal display panel, a thin film transistor at intersections of the data lines and gate lines, and at least two types of a plurality of integrated circuits at peripheral portion of the liquid crystal display panel to drive the liquid crystal display panel includes steps of forming first signal lines directly on the substrate of the liquid crystal display panel to supply an input driving signal to the plurality of first type integrated circuits; and forming second signal lines to supply an output driving signal to the liquid crystal display panel generated in the plurality of first type integrated circuits, wherein at least one of a line width and a line thickness of each of the second signal lines are different such that a resistance value of corresponding first signal lines are different from each other.

In another aspect, the line on glass liquid crystal display includes a liquid crystal display panel on a substrate and having liquid crystal cells in matrix; gate lines and data lines on the liquid crystal display panel; a thin film transistor at intersections of the gate lines and data lines; at least two types of a plurality of integrated circuits at peripheral portion of the liquid crystal display panel to drive the liquid crystal display panel; and first signal lines and second signal lines being connected to the plurality of first type integrated circuits, the first signal lines to supply an input driving signal to the plurality of first type integrated circuits, wherein a resistance value of each of the first signal lines increases as a line length becomes longer, and the second signal lines to supply an output driving signal to the liquid crystal display panel generated in the plurality of first type integrated circuits, wherein a cross sectional area across each of the second signal lines are different such that the resistance value of corresponding first signal lines are different from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. The preferred embodiments of the present invention will be described in detail with reference to FIGS. 3 to 5.

Figure 3:
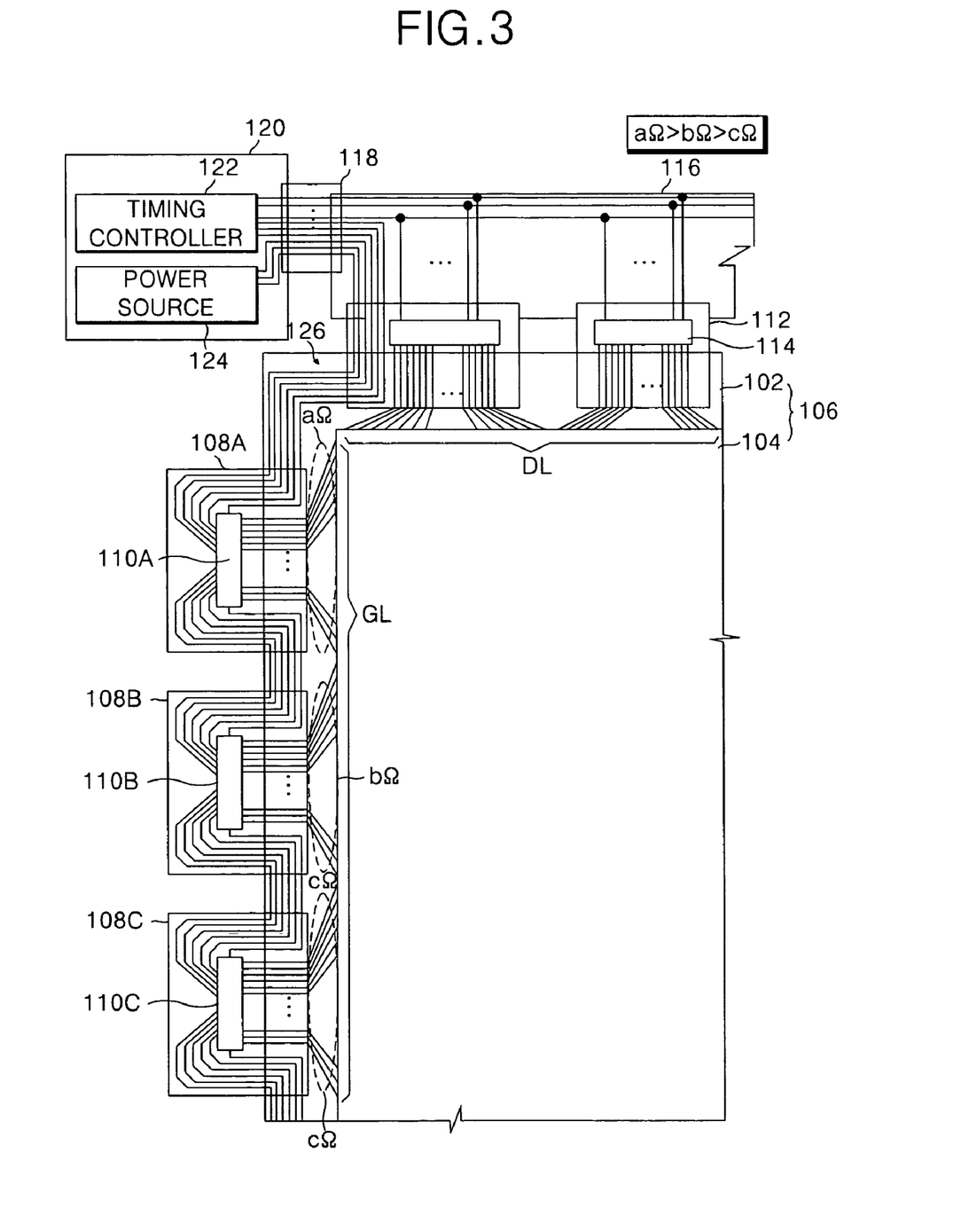
FIG. 3 is a plan view illustrating a LOG liquid crystal display according to an exemplary embodiment of the present invention.

FIG. 3 shows a line on glass (LOG) type liquid crystal display according to an exemplary embodiment of the present invention. Referring to FIG. 3, the LOG liquid crystal display according to the exemplary embodiment of the present invention includes a liquid crystal display panel 106 having liquid crystal cells in matrix, a gate drive integrated circuit(IC) 110 for driving gate lines GL of the liquid crystal display panel 106, a data drive IC 114 for driving data lines DL of the liquid crystal display panel 106, a timing controller 122 for controlling the gate drive IC 110 and the data drive IC 114, and a power supply 124 for generating a driving voltage required for driving the liquid crystal display.

The power supply 124 generates driving voltages (i.e., a high gate voltage VGH, a low gate voltage VGL, a reference gamma voltage and a common voltage VCOM, etc.) required to drive the liquid crystal display using a voltage input from a system power supply (not shown) to the timing controller 122, the data drive IC 114 and the gate drive IC 110, and other relevant circuit element.

The timing controller 122 interfaces video data R, G and B from the graphic card and apply to the data drive IC 114. Furthermore, the timing controller 122 generates the timing signals and the control signals for controlling a timing of the data and gate drive ICs 114 and 110 in response to a control signal from the graphic card.

In the liquid crystal display panel 106, a thin film transistor array substrate 102 and a color filter array substrate 104 are joined to each other by interposing a liquid crystal therebetween. The liquid crystal display panel 106 is provided with liquid crystal cells, in which the liquid crystal cells are driven by the thin film transistor provided at the intersections of gate lines GL and data lines DL. The thin film transistor applies a pixel signal from the data line DL to the liquid crystal cell in response to a scanning signal from the gate line GL.

The data drive ICs 114 are connected to the data line DL via the data TCP 112 and a data pad of the liquid crystal display panel 106. The data drive ICs 114 convert a pixel data into an analog pixel signal and apply to the data lines DL. The data drive ICs 114 receive a data control signal, a pixel data, and power signals from the timing controller 122 and the power supply 124 mounted on the main PCB 120 using the data PCB 116 and the FPC 118.

The gate drive ICs 110 are connected to the gate lines GL via the gate TCP 108 and a gate pad of the liquid crystal display panel 106. The gate drive ICs 110 sequentially apply a scanning signal having a high gate voltage VGH to the gate lines GL. Furthermore, the gate drive ICs 110 apply a low gate voltage VGL to the gate lines GL in the remaining interval when the high gate voltage VGH is not supplied.

The gate control signals from the timing controller 112 and the power signals from the power supply 124 are applied to the data TCP 112 via the data PCB 116. In addition, the gate control signals from the timing controller 122 and the power signals from the power supply 124 are applied to a first gate TCP 108A via a LOG signal line 126 provided at the edge portion of the thin film transistor array substrate 102. Signals applied to the first gate TCP 108A are input to a first gate drive IC 110A via input terminals of the first gate drive IC 110A. The signals (i.e., the gate control signals and the power signals) output through output terminals of the first gate drive IC 110A are input to a second gate drive IC 110B provided in a second gate TCP 108B via the first gate TCP 108A and the LOG signal line group 126.

The LOG signal line group 126 typically comprises signal lines for supplying the gate voltage signals supplied from the power supply 124, in which the gate voltage signals include a low gate voltage VGL, a high gate voltage VGH, a common voltage VCOM, a ground voltage GND and a base driving voltage VCC. In addition, the LOG signal line group 126 comprises signals lines for supplying the gate control signals from the timing controller 122, in which the gate control signals include a gate start pulse GSP, a gate shift clock signal GSC and a gate enable signal GOE. In addition, the LOG signal line group 126 has a line resistance in proportion to the line length thereof. Accordingly, a gate driving signal decreases in proportion to the line length of the LOG signal line group 126.

To compensate a voltage difference of the gate driving signal supplied by the gate drive ICs 110 and a line resistance of the LOG signal line group 126, a line width or a thickness of an output terminal of the gate drive ICs 110 is formed in proportion to the length of the LOG signal line group 126. In other words, as the line length of the LOG signal line group 126 becomes longer, the line resistance increases in proportion to the line length, and the line width of the output terminal of the gate drive IC 110 makes wider. In addition, longer the length of the LOG signal line group 126, the thickness of the output terminal of the gate drive IC 110 is increased.

Figure 4:
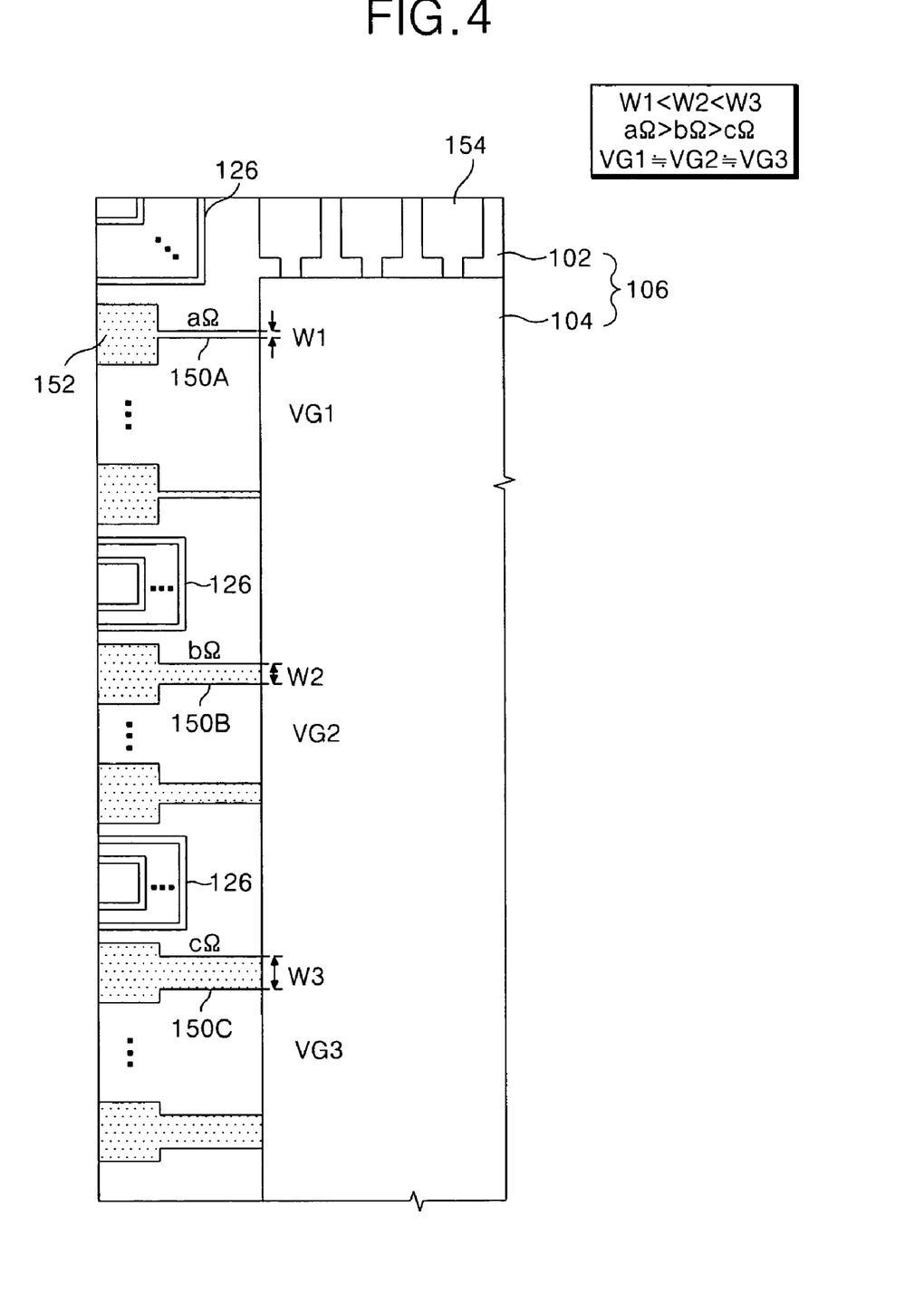
FIG. 4 is a plan view illustrating details of the liquid crystal display panel of FIG. 3.

As shown in FIG. 4, the output terminal of the gate drive IC 110 includes any one of an output pad of the gate TCP 108 where the gate drive IC 110 is mounted, a gate pad 152 connected to the output pad of the gate TCP 108, and a gate link 150 connected to the gate pad 152. Next, a method to adjust the line width of the gate link 150 to compensate the voltage difference, in which the gate link 150 is the output terminal of the gate drive IC 110, is described.

A first gate drive IC 110A mounted on a first gate TCP 108A and a first gate link 150A connected to the gate pad 152 are formed to have a first line width W1. A first gate driving signal VG1 is supplied to the gate lines, in which the gate driving signal VG1 is voltage-dropped in proportion to a line resistance aΩ of the first gate link 150A having the first line width W1.

A second gate drive IC 110B mounted on a second gate TCP 108B and a second gate link 150B connected to the gate pad 152 are formed to have a second line width W2, which is wider than the first line width W1. A second gate driving signal VG2 is supplied to the gate lines, in which the gate driving signal VG2 is voltage-dropped in proportion to a line resistance bΩ (bΩ<aΩ) of the second gate link 150B having the second line width W2. The second gate drive IC 110B generates a second gate driving signal VG2 having a relatively lower voltage level than that of the first gate driving signal VG1 by the LOG signal line group 126. An amount of voltage drop of the second gate driving signal VG2 is smaller than the first gate driving signal VG1 because the line width of the second gate link 150B is wider than the first gate link 150A. Accordingly, a voltage level of the second gate driving signal VG2 supplied to the gate line through the second gate link 150B is similar to a voltage level of the first gate driving signal VG1.

A third gate drive IC 110C mounted on a third gate TCP 108C and a third gate link 150C connected to the gate pad 152 are formed to have a third line width W3, which is wider than the second line width W2. A third gate driving signal VG3 is supplied to the gate lines, in which the gate driving signal VG3 is voltage-dropped in proportion to a line resistance cΩ (cΩ<bΩ) of the third gate link 150C having the third line width W3. The third gate drive IC 110C generates a third gate driving signal VG3 having a relatively lower voltage level than that of the second gate driving signal VG2 by the LOG signal line group 126. The amount of voltage drop of the third gate driving signal VG3 is smaller than the second gate driving signal VG2 because the line width of the third gate link 150C is wider than the second gate link 150B. Accordingly, a voltage level of the third gate driving signal VG3 supplied to the gate line through the third gate link 150C is similar to the voltage level of the second gate driving signal VG2.

Figure 5:
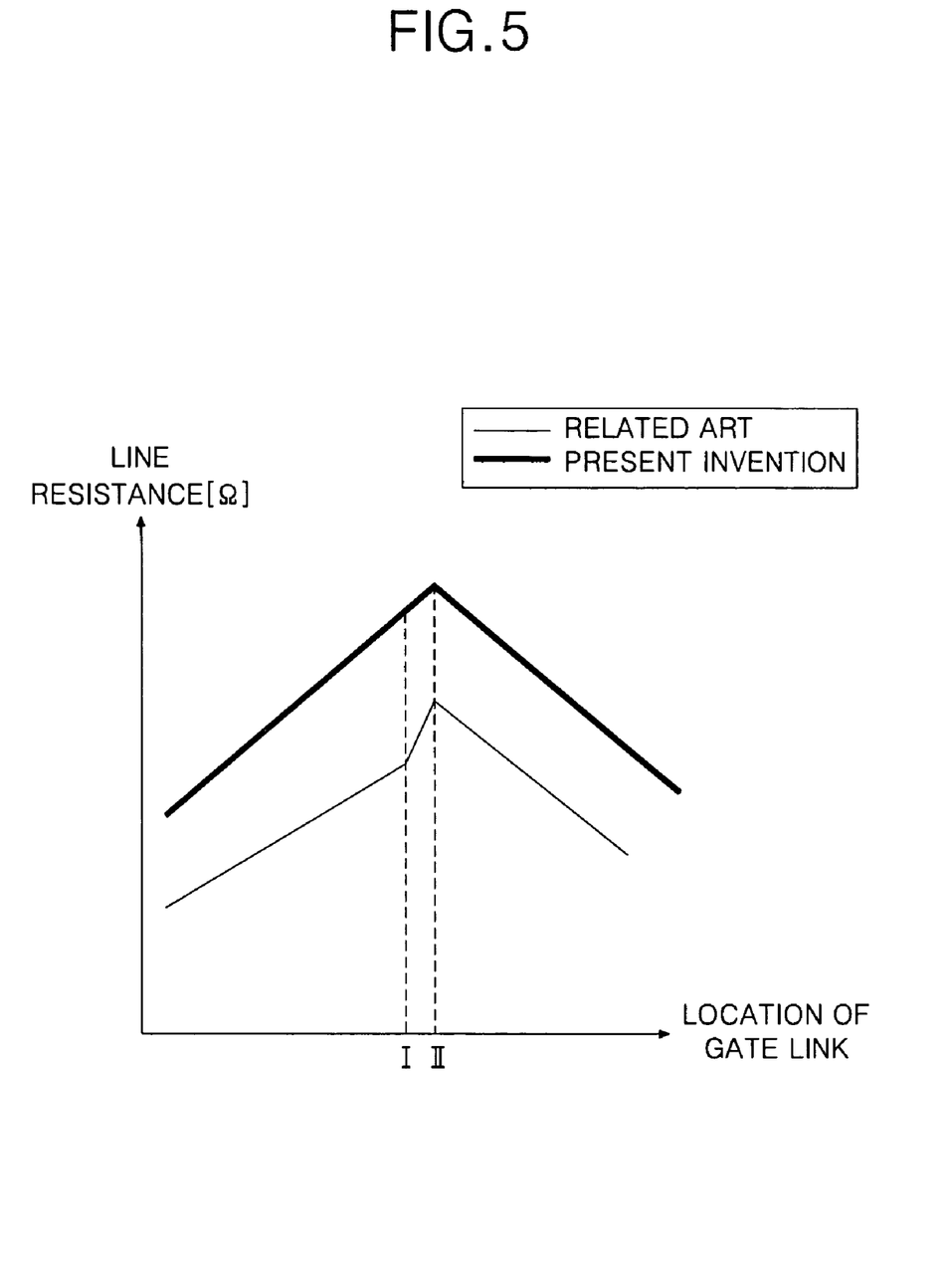
FIG. 5 is a graph showing the relationship of a line resistance with respect to a location of gate link between the related art LOG LCD and the LOG LCD of the present invention.

FIG. 5 is a graph showing the relationship of the line resistance with respect to a location of gate link between the related art LOG LCD and the LOG LCD of the present invention. In FIG. 5, the horizontal axis represents a location of the gate link and the vertical axis represents a line resistance of the corresponding gate link.

Referring to FIG. 5, a line resistance value of the related art LOG LCD at the last link I connected to the last output terminal of the ith gate drive IC is substantially different from a line resistance value of the first link II connected to the first output terminal of the i+1th gate drive IC. Accordingly, a gate driving signal applied to the gate line connected to the last output terminal of the ith gate drive IC is substantially different from a gate driving signal applied to the ate line connected to the first output terminal of the i+1th gate drive IC. Thus, a horizontal stripe is displayed between the last output terminal of the ith gate drive IC and the first output terminal of the i+1th gate drive IC.

On the other hand, the LOG LCD of the present invention, there is almost a no difference between the line resistance value of the last link I connected to the last output terminal of the ith gate drive IC and the line resistance value of the first link II connected to the first output terminal of i+1th gate drive IC. Accordingly, a horizontal stripe phenomenon is prevented at the boundary between the last output terminal of the ith gate drive IC and the first output terminal of the i+1th gate drive IC.

In the LOG LCD of the present invention, the gate links connected to the corresponding gate drive IC can be formed to have a different line width or different thickness from each other in a predetermined range. For example, as the location of the output terminal changes from middle one to outer one, the line width of the gate link becomes gradually wider or the thickness of the gate line becomes gradually thicker. Furthermore, the LOG LCD structure which is removed of the data PCB can be used in addition to the LOG LCD structure which is removed of the gate PCB.

As described above, in the LOG liquid crystal display and a method of fabricating the same, the line widths of gate links provided at the output terminal of the gate drive ICs are formed to have different width or different heights from each other. Thus, the gate driving signals output from each of the gate links connected to respective gate drive IC have similar values and can be supplied to the gate lines. Accordingly, it is possible to prevent the horizontal line stripe at the boundaries of the horizontal line blocks by compensating a difference in the gate driving signals of the adjacent gate drive ICs.

It will be apparent to those skilled in the art that various modifications and variations can be made in the line on glass (LOG) type liquid crystal display and method of fabricating the same of the present invention without departing from the spirit or scope of the invention. Thus, it is intended that the present invention covers the modifications and variations of this invention provided they come within the scope of the appended claims and their equivalents.

What is claimed is:

1. A line on glass liquid crystal display, comprising:
   a liquid crystal display panel on a substrate and having liquid crystal cells in matrix;
   gate lines and data lines on the liquid crystal display panel;
   a thin film transistor at intersections of the gate lines and data lines;
   at least two types of a plurality of integrated circuits at peripheral portion of the liquid crystal display panel to drive the liquid crystal display panel;
   first signal lines formed directly on the substrate of the liquid crystal display panel to supply an input driving signal to the plurality of first type integrated circuits; and
   second signal lines to supply an output driving signal to the liquid crystal display panel generated in the plurality of first type integrated circuits,
   wherein
   at least one of a line width and a line thickness of each of the second signal lines are different such that a resistance value of corresponding first signal lines are different from each other.

2. The line on glass liquid crystal display according to claim 1, wherein the line width of first of the second signal lines connected to an output terminal of first of the first type integrated circuit is the narrowest among the second signal lines, and the line width of last of the second signal lines connected to the output terminal of last of the first type integrated circuit is the widest among second signal lines.

3. The line on glass liquid crystal display according to claim 1, wherein the line thickness of first of the second signal lines connected to the output terminal of first of the first type integrated circuit is the thinnest among the second signal lines, and the line thickness of last of the second signal lines connected to the output terminal of last of the first type integrated circuit is the thickest among the second signal lines.

4. The line on glass liquid crystal display according to claim 1, wherein the first type integrated circuit is a gate integrated circuit to supply a gate signal to the gate line via the second signal lines.

5. The line on glass liquid crystal display according to claim 1, wherein a second type of integrated circuit is a data integrated circuit to supply a data signal to a data line that intersects with the gate line.

6. The line on glass liquid crystal display according to claim 1, wherein the input driving signal is any one of a high logical voltage of a gate signal, a low logical voltage of the gate signal, a base common voltage, a ground voltage, and a common voltage, and supplied to the plurality of first type of integrated circuits via the first signal lines.

7. The line on glass liquid crystal display according to claim 1, wherein the output driving signal is any one of a high gate voltage and a low gate voltage, and supplied to the gate line via the second signal lines.

8. A method of fabricating a lines on glass type liquid crystal display including a liquid crystal display panel having liquid crystal cells in matrix on a substrate, data lines and gate lines on the liquid crystal display panel, a thin film transistor at intersections of the data lines and gate lines, and at least two types of a plurality of integrated circuits at peripheral portion of the liquid crystal display panel to drive the liquid crystal display panel, the method comprising steps of:

forming first signal lines directly on the substrate of the liquid crystal display panel to supply an input driving signal to the plurality of first type integrated circuits; and forming second signal lines to supply an output driving signal to the liquid crystal display panel generated in the plurality of first type integrated circuits, wherein at least one of a line width and a line thickness of each of the second signal lines are different such that a resistance value of corresponding first signal lines are different from each other.

9. The method according to claim 8, wherein the line width of first of the second signal lines connected to an output terminal of first of the first type integrated circuit is the narrowest among the second signal lines, and the line width of last of the second signal lines connected to the output terminal of last of the first type integrated circuit is the widest among the second signal lines.

10. The method according to claim 8, wherein the thickness of first of the second signal lines connected to the output terminal of first of the first type integrated circuit is the thinnest among the second signal lines, and the thickness of last of the second signal lines connected to the output terminal of last of the first type integrated circuit is the thickest among the second signal lines.

11. The method according to claim 8, wherein the step of forming the first signal lines on the substrate of the liquid crystal display panel to supply the input driving signal to the plurality of first type integrated circuits via the first signal line includes, forming the first signal lines to supply any one of a high logical voltage of a gate signal, a low logical voltage of the gate signal, a base common voltage, a ground voltage, and a common voltage.

12. The method according to claim 8, wherein the step of forming the second signal lines to supply the output driving signal to the liquid crystal display panel generated in the plurality of first type integrated circuits via the second signal line includes, forming the second signal lines to supply any one of a high gate voltage and a low gate voltage.

13. A line on glass liquid crystal display, comprising:

a liquid crystal display panel on a substrate and having liquid crystal cells in matrix;

gate lines and data lines on the liquid crystal display panel;

a thin film transistor at intersections of the gate lines and data lines;

at least two types of a plurality of integrated circuits at peripheral portion of the liquid crystal display panel to drive the liquid crystal display panel; and first signal lines and second signal lines being connected to the plurality of first type integrated circuits, the first signal lines to supply an input driving signal to the plurality of first type integrated circuits, wherein a resistance value of each of the first signal lines increases as a line length becomes longer, and the second signal lines to supply an output driving signal to the liquid crystal display panel generated in the plurality of first type integrated circuits, wherein a cross sectional area across each of the second signal lines are different such that the resistance value of corresponding the first signal lines are different from each other.

14. The plurality of signal lines on a line on glass liquid crystal display according to claim 13, wherein the input signal include a high logical voltage of a gate signal, a low logical voltage of the gate signal, a base common voltage, a ground voltage, and a common voltage, and the output signal include a high gate voltage and a low gate voltage.

15. The plurality of signal lines on a line on glass liquid crystal display according to claim 13, wherein the first of the first signal lines includes the least resistance value among the first signal lines and the first of the second signal lines includes the least cross sectional area among the second signal lines, wherein at least one of a line width and a thickness of the first of the second signal lines has a least value.

16. The plurality of signal lines on a line on glass liquid crystal display according to claim 13, wherein the last of the first signal lines includes the greatest resistance value among the first signal lines, and the last of the second signal lines includes the greatest cross sectional area among the second signal lines, wherein at least one of the line width and the thickness of the last of the second signal lines has a greatest value.

17. The plurality of signal lines on a line on glass liquid crystal display according to claim 13, the first type of integrated circuit is a gate integrated circuit, and a second type of integrated circuit is a data integrated circuit supplying data signal to the liquid crystal panel.

* * * * *